(12) United States Patent
Matsuda et al.

(10) Patent No.: US 11,115,649 B1
(45) Date of Patent: Sep. 7, 2021

(54) SYSTEMS AND METHODS FOR SYNCHRONIZING EYEWEAR DEVICES WITH DISPLAYS

(71) Applicant: Facebook Technologies, LLC, Menlo Park, CA (US)

(72) Inventors: Nathan Matsuda, Seattle, WA (US); Ryan Michael Ebert, Issaquah, WA (US); Robert Birch, Redmond, WA (US); Bruce A. Cleary, Bothell, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/808,419

(22) Filed: Mar. 4, 2020

(51) Int. Cl.
*H04N 13/00* (2018.01)
*H04N 13/398* (2018.01)
*H04N 13/344* (2018.01)
*G02F 1/133* (2006.01)
*H04N 13/30* (2018.01)

(52) U.S. Cl.
CPC ......... *H04N 13/398* (2018.05); *H04N 13/344* (2018.05); *G02F 1/13306* (2013.01); *H04N 2013/40* (2018.05)

(58) Field of Classification Search
CPC .............. H04N 13/398; H04N 13/344; H04N 2013/40; H04N 13/00; H04N 13/04; G02F 1/13306

USPC ............................................ 348/500, 56, 51
See application file for complete search history.

(56) References Cited

U.S. PATENT DOCUMENTS

2014/0132744 A1  5/2014  Wu et al.
2017/0280134 A1  9/2017  Woods

FOREIGN PATENT DOCUMENTS

WO        2007/117485 A2    10/2007

OTHER PUBLICATIONS

International Search Report and Written Opinion received for PCT Application Serial No. PCT/US2021/014782 dated Apr. 21, 2021, 10 pages.

*Primary Examiner* — Trang U Tran
(74) *Attorney, Agent, or Firm* — FisherBroyles, LLP

(57) ABSTRACT

The disclosed system may include a communication device configured to receive wireless synchronization information for display content, a lens, an optical device, and a controller configured to determine that the display content is in a field of view of the lens, and in response to determining that the display content is within the field of view of the lens, cause the lens to selectively allow the display content to pass through the lens based on the wireless synchronization information. Various other related methods and systems are also disclosed.

20 Claims, 11 Drawing Sheets

SYSTEMS AND METHODS FOR SYNCHRONIZING EYEWEAR DEVICES WITH DISPLAYS

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
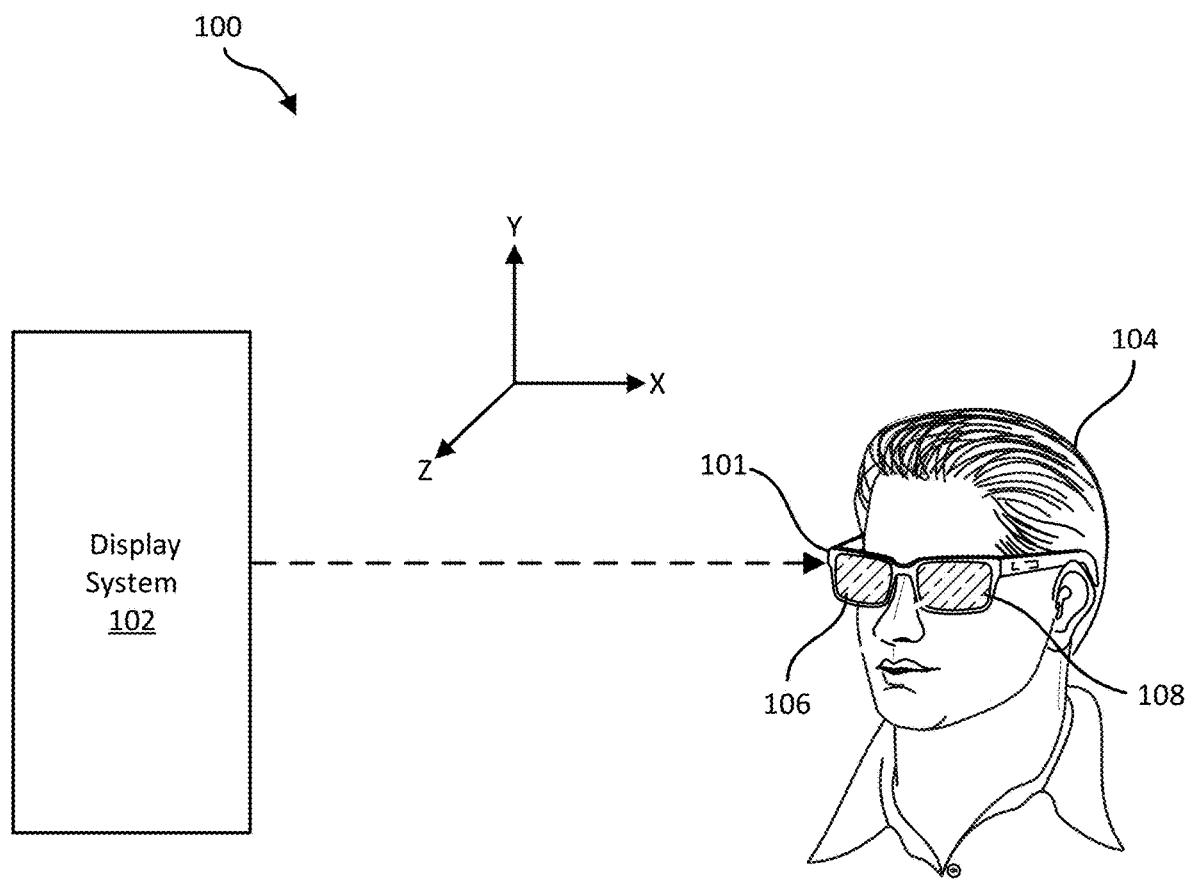
FIG. 1 illustrates an example system for synchronizing an eyewear device with a display according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to devices, systems, and methods that may be employed to display content when a display is within a field of view of a lens of a device worn by a viewer. The lens may be part of a wearable system (e.g., artificial-reality glasses) that further includes a communication device, an optical device (e.g., a camera), and a controller. The controller may be configured to determine that the display content is within the field of view of the lens based on images captured by the camera. The controller may be further configured to cause the lens to selectively allow the display content to pass through the lens based on wireless synchronization information received by the communication device.

Traditional display systems may display content (e.g., video content, artificial-reality content, etc.) as a single stream of content independent of the field of view of a lens. For example, a display system in a public area may only be able to provide a single stream of content for all viewers in the area. To provide different content for each viewer, a traditional display system would need to provide a different display for each unique stream of content. Further, the viewers would not have control over the type of content being displayed, and the content would not be personalized to the interests of the viewers. To overcome these limitations, embodiments the present disclosure provide methods of synchronizing eyewear devices with a display and displaying different streams of content to multiple viewers within the field of view of the display content. In some examples, the content may be personalized to the viewer.

The present disclosure is generally directed to devices, systems, and methods that may be employed to improve and provide alternative modes of displaying content to a viewer and/or multiple viewers within the field of view of the content from a single display. In some examples, content may be personalized and based on a profile of the viewer (e.g., a user). As will be explained in greater detail below, embodiments of the present disclosure may present content to a single viewer and/or multiple viewers within the field of view of the content from a single display by synchronizing eyewear devices to allow certain frames of content to pass through the lenses (e.g., the lenses may be transparent or otherwise configured such that display content selected for a wearer of the lenses passes through the lenses) and to prevent other frames of content from passing through the lenses (e.g., the lenses may be opaque or otherwise configured such that display content does not pass through the lenses during time slots when content is displayed for other users, thereby preventing the other users from viewing content not selected for them). For example, a display system may be physically located in a public area open to many users, such as a shopping mall, a sports arena, an urban street, etc. As the viewer enters a field of view of the display system, the display system may send synchronization information to eyewear donned by the viewer that allows the viewer to see the content on the display. Lenses of the eyewear may selectively allow the display content to pass through the lenses for viewing by the viewer.

As described below in detail with reference to FIGS. 1-4, viewers within the field of view of the display may view the content when the lens of an eyewear device worn by the viewer is synchronized with the display to be transparent to pass the display content. The display content may be in the field of view of the lens when the lens is positioned such that displayed content is capable of passing through a transparent or semi-transparent lens. The field of view may be the extent of a field that can be viewed by a user through the lens, a field of view of a camera of the eyewear device, etc. Embodiments may include determining that display content is in the field of view of the lens and selectively allowing the display content to pass through the lens based on wireless synchronization information received by a lens controller. As described in detail below with reference to FIGS. 1, 2, and 7, determining that display content is in the field of view of the lens may include determining that the display content is visible to a camera of an eyewear device and/or that the eyewear device is within a threshold distance from the display system. As another example, determining that display content is in the field of view of the lens may include determining that the lens is at a certain angle and/or within a certain arc relative to a plane of the display system. Determining that display content is in the field of view of the lens may be based on a horizontal and/or a vertical viewing angle of the lens and/or images from a camera relative to the display system. The lens may selectively allow the display content to pass through the lens based on wireless synchronization information. The disclosed methods of providing content to users when lenses worn by the user are within the field of view of a display may create a more compelling and/or customized content consumption experience.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 5:
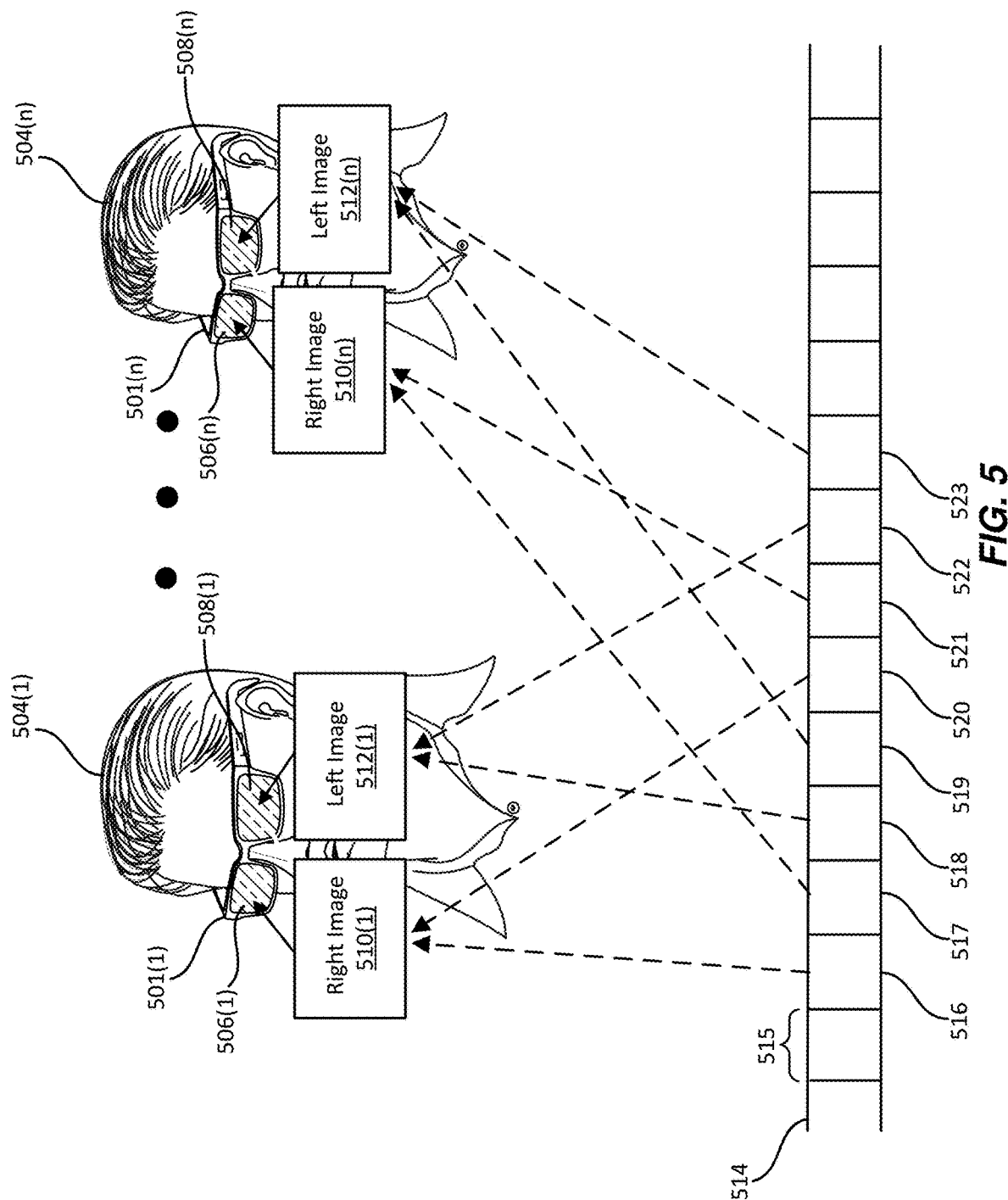
FIG. 5 illustrates an example of a display device displaying sequential content frames to multiple users according to at least one embodiment of the present disclosure.
Figure 6:
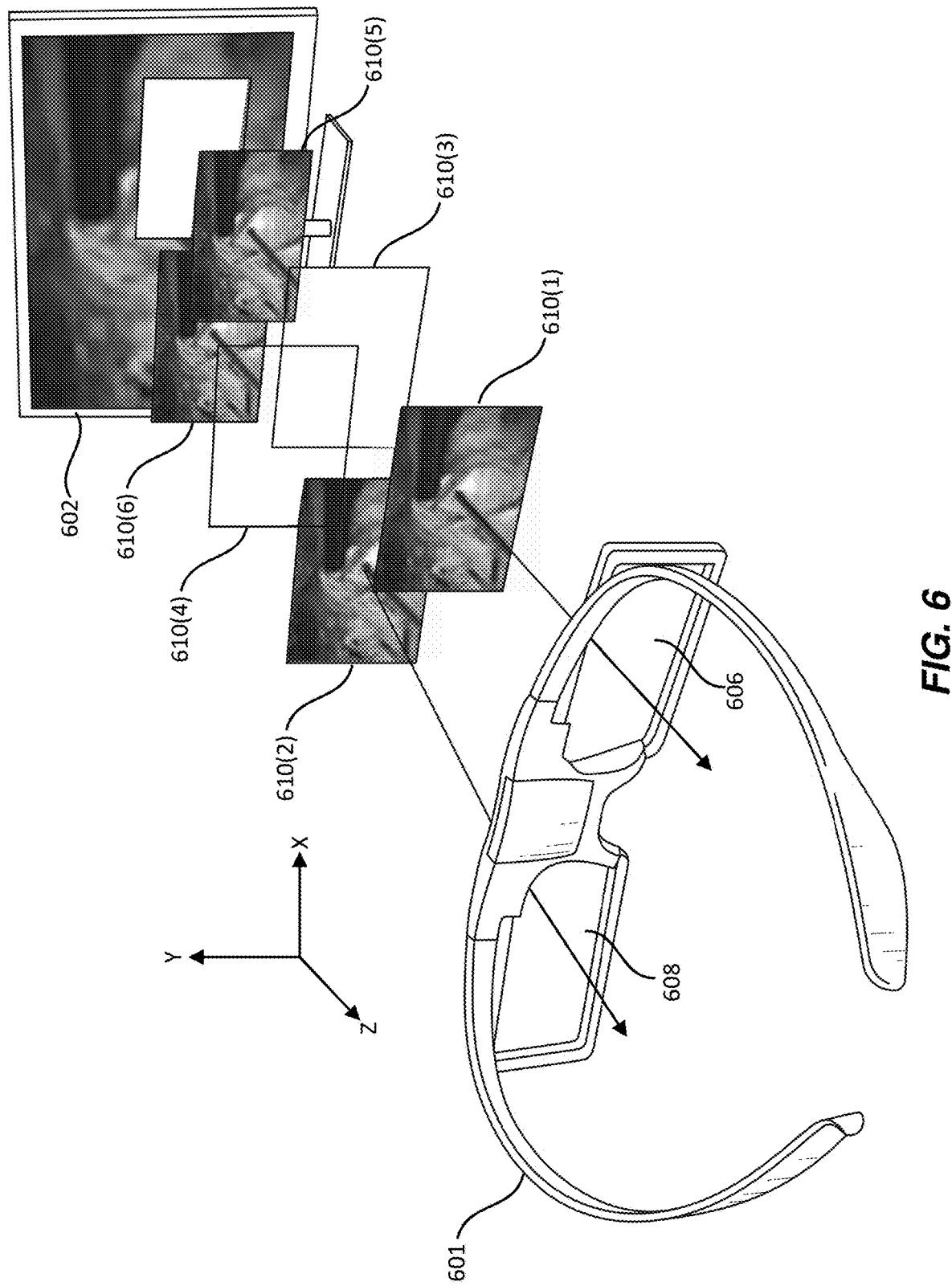
FIG. 6 illustrates an example of a display device displaying three-dimensional content to multiple viewers according to at least one embodiment of the present disclosure.
Figure 7:
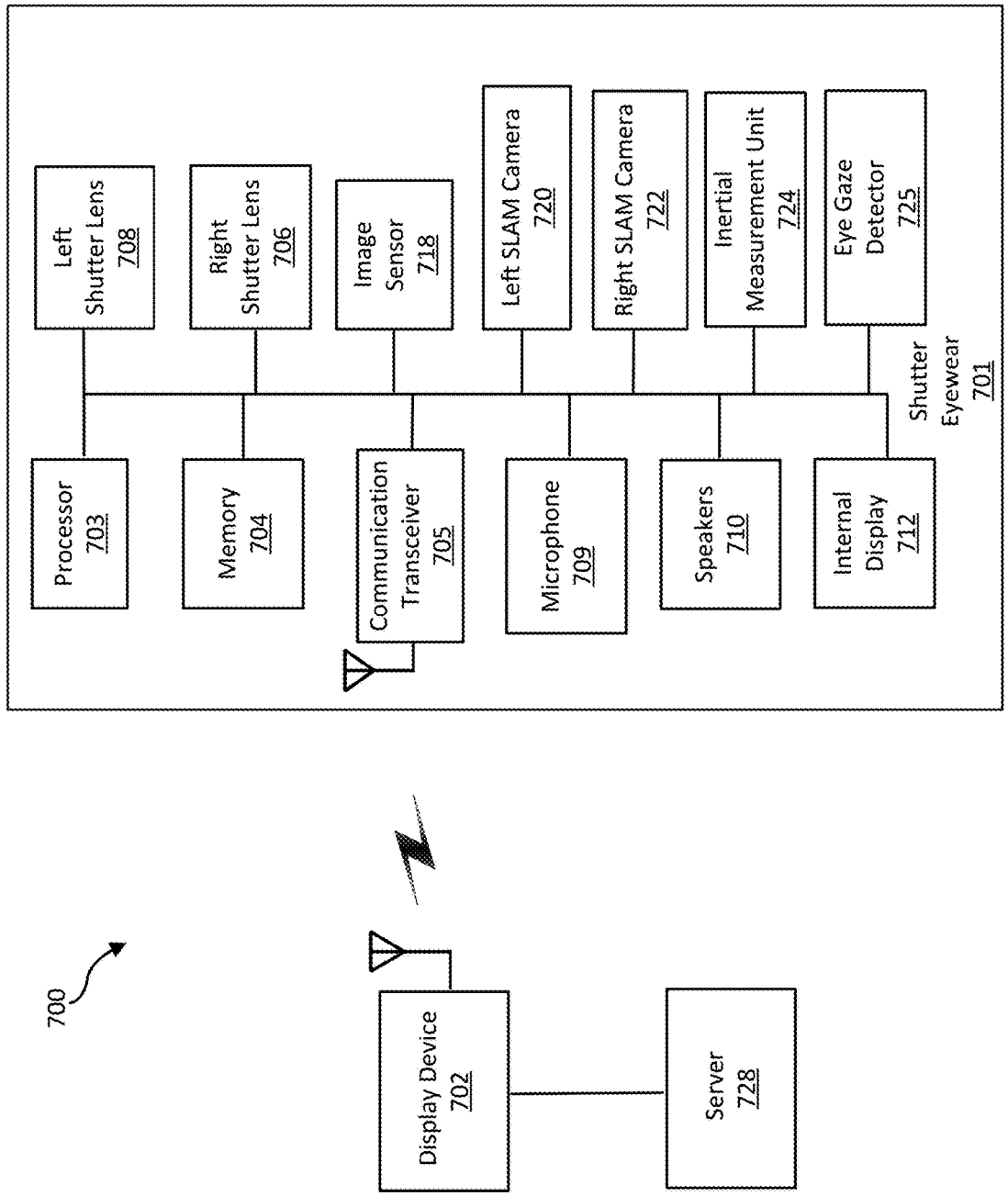
FIG. 7 is a block diagram of an example system for displaying personalized content to a user based on the user's physical position according to at least one embodiment of the present disclosure.
Figure 8:
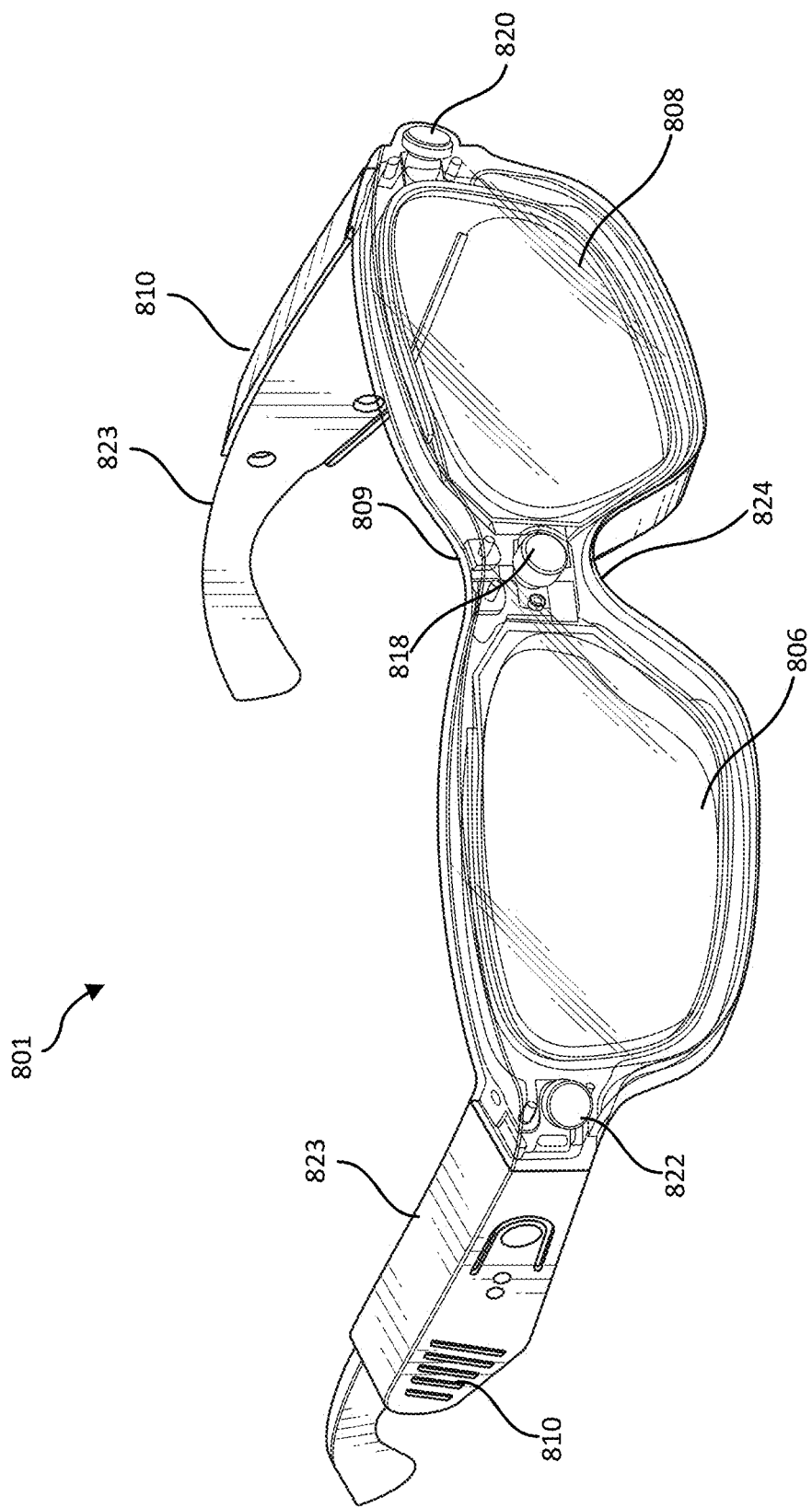
FIG. 8 illustrates an example of component positioning within an eyewear device according to at least one embodiment of the present disclosure.
Figure 9:
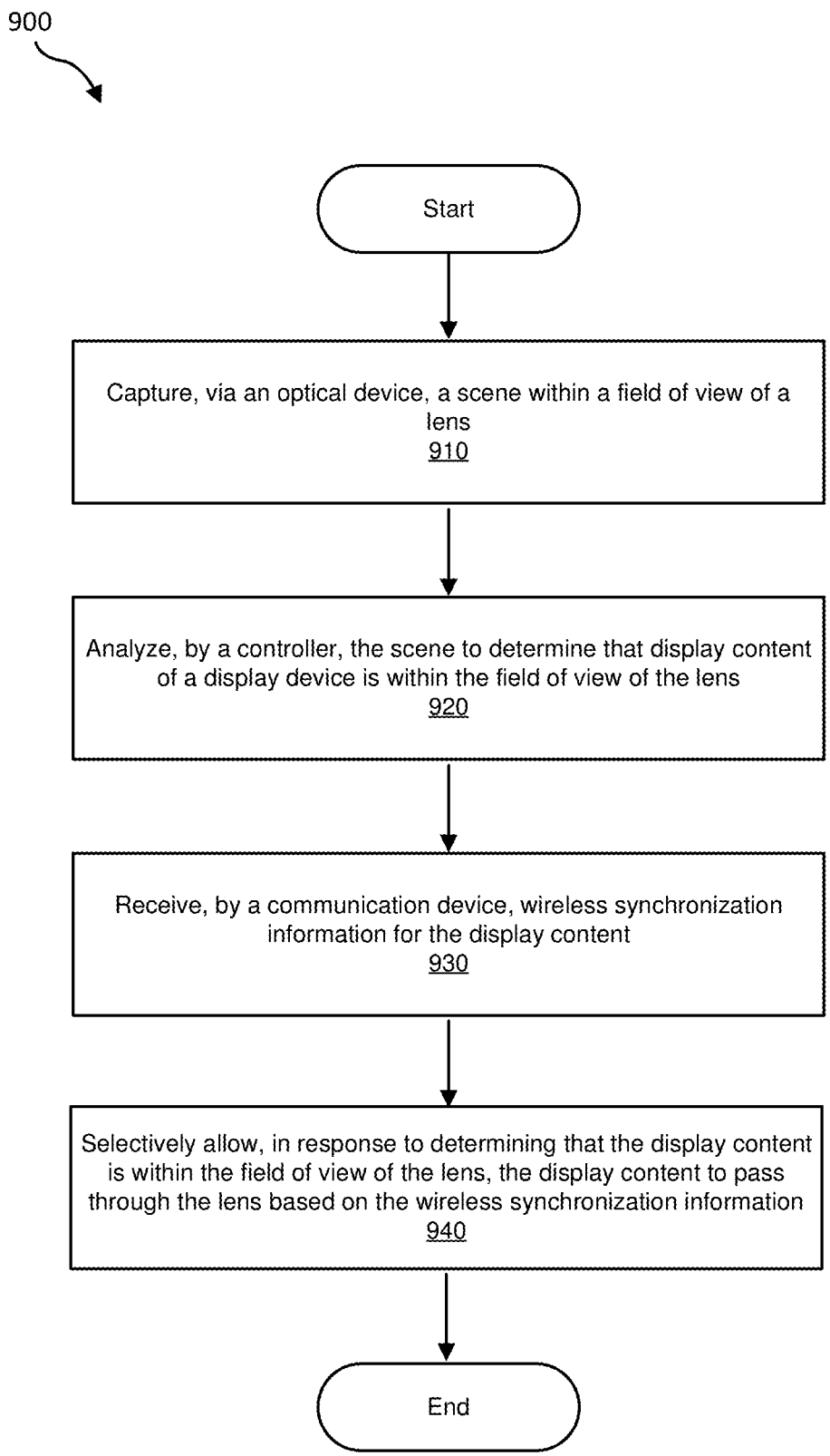
FIG. 9 is a flow diagram illustrating an example method of displaying personalized content to a user via an eyewear device according to at least one embodiment of the present disclosure.
Figure 10:
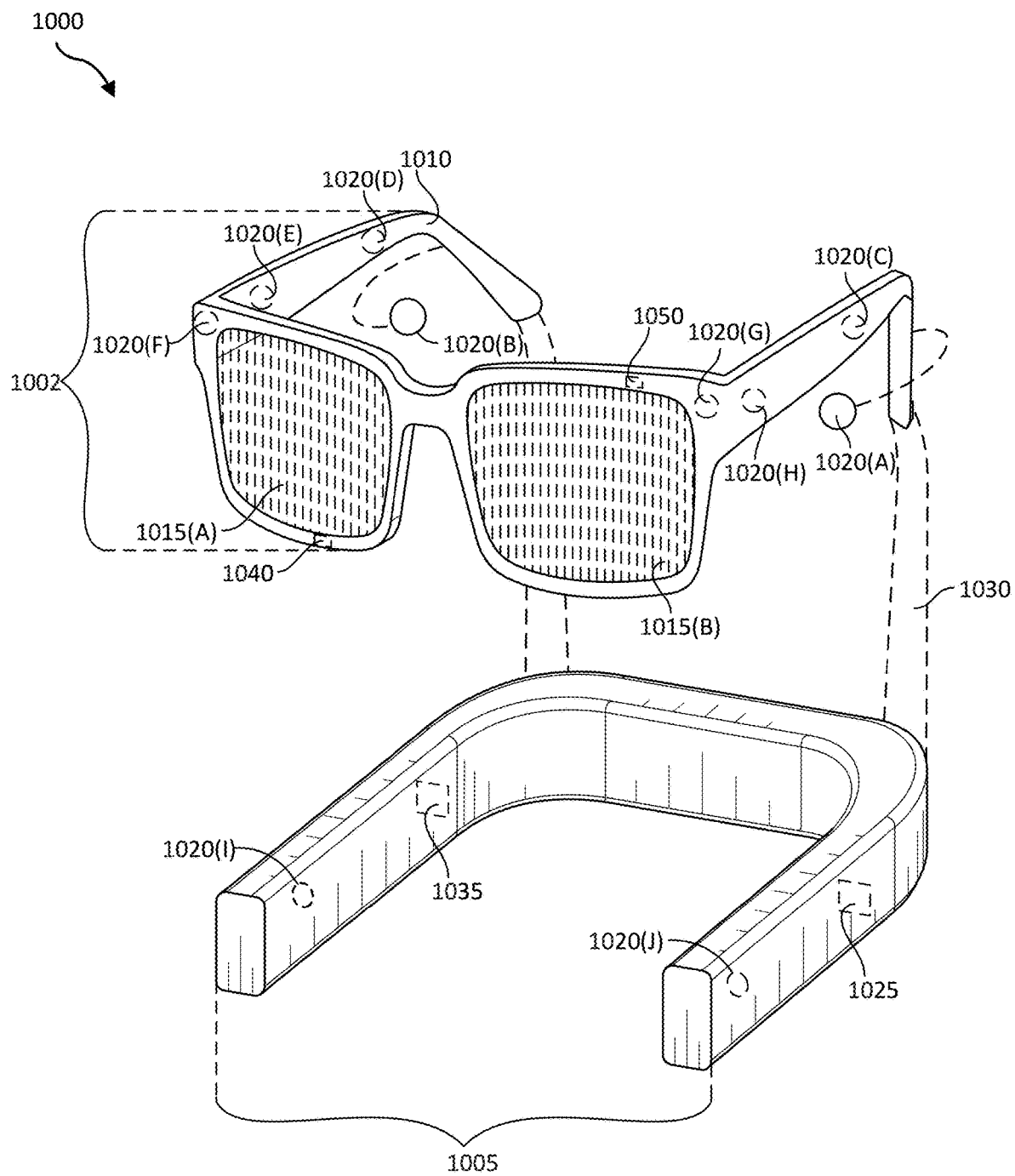
FIG. 10 is an illustration of example augmented-reality glasses that may be used in connection with embodiments of this disclosure.
Figure 11:
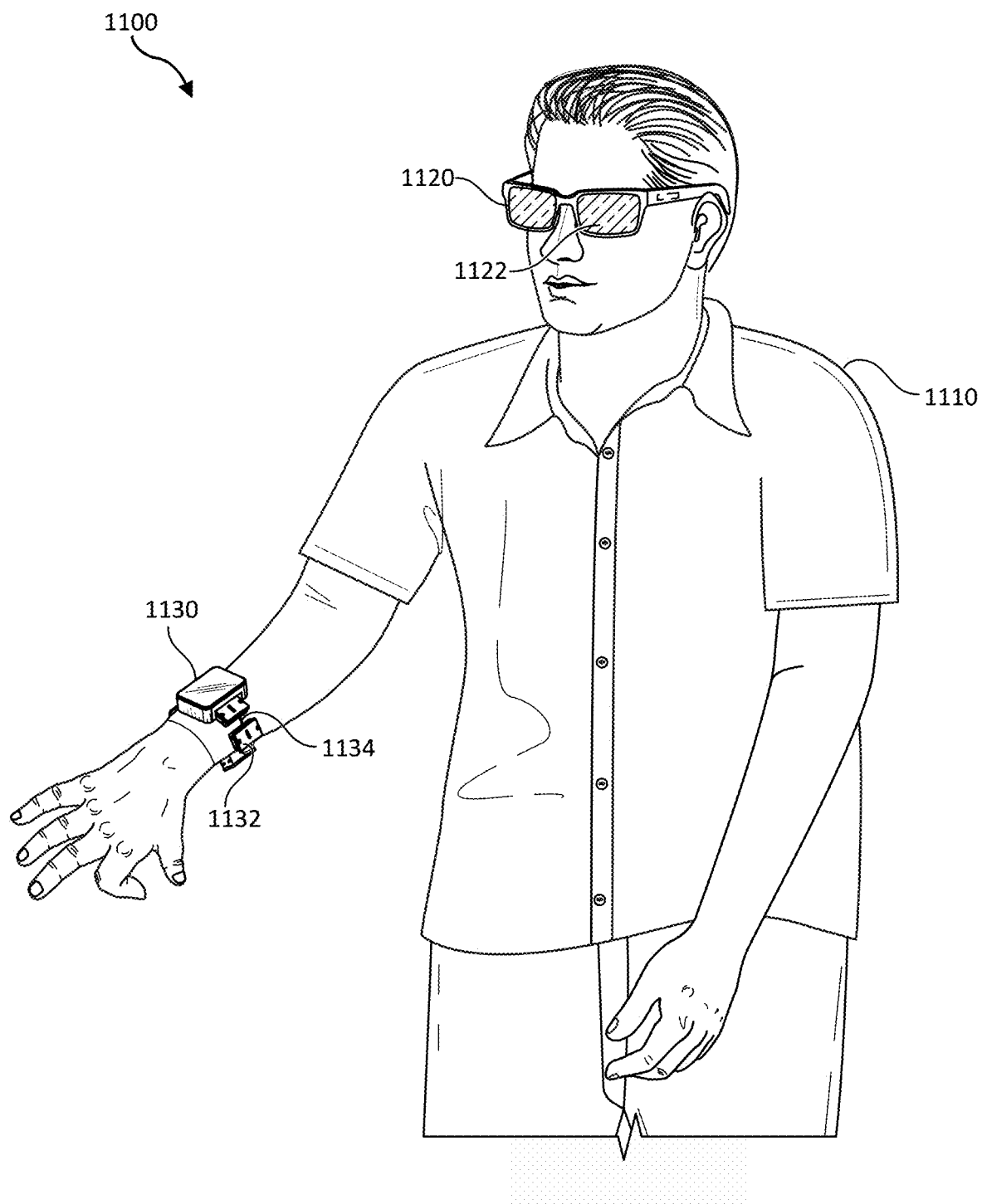
FIG. 11 is an illustration of an example augmented-reality environment according to embodiments of this disclosure.

The following will provide, with reference to FIGS. 1-11, detailed descriptions of methods, systems, and devices for displaying content (e.g., personalized content) to a user via an eyewear device when display content is in the field of view of the eyewear device. First, a description of example systems for synchronizing display content with eyewear devices when the display content is in the field of view of the eyewear device is presented in reference to FIGS. 1-2. With reference to FIGS. 3-6, the following will describe the eyewear device and display devices for providing personalized content to users. FIG. 7 describes a block diagram of a system for providing personalized content to users when the content is in the field of view of the eyewear device. FIG. 8 describes component positioning within an eyewear device. FIG. 9 illustrates a method of providing personalized content to users via eyewear devices when the content is in the field of view of the eyewear devices. FIGS. 10 and 11 illustrate various types of example artificial-reality devices that may be used with display devices and eyewear devices.

FIG. 1 illustrates a system 100 for providing content (e.g., personalized content) to a viewer (e.g., a user) via an eyewear device. Referring to FIG. 1, a user 104 may don an eyewear device 101 in order to view personalized content on a display system 102 when the content comes into the field of view of eyewear device 101. In accordance with an embodiment of the present disclosure, system 100 may provide personalized and/or confidential viewing of two-dimensional (2D) video content and/or three-dimensional (3D) video content on display system 102 by time multiplexing the displaying of the video content when the content is in the field of view of the eyewear device. In some examples, the content may be artificial-reality content as described below with respect to FIGS. 10 and 11.

With the aid of time-synchronized eyewear device 101, an intended user may view the personalized video content confidentially without risking the possibility of unauthorized viewing by others. Additional advantages of the present disclosure may include personalized content viewing based on a field of view, a position, a location, an orientation, or an eye-gaze direction of the user relative to the display. Further, the content displayed to the user may be personalized to the user's preferences as described in detail below with respect to FIG. 2. The personalized content may be viewed only by those viewing the content through an eyewear device and are within the field of view of the content. Eyewear device 101 may incorporate time synchronized LCD shutters, variable polarizers, color filters, active polarized lenses, and/or other technologies that may selectively block or allow viewing of the personalized video content, thereby providing confidential and secure viewing of the personalized video content by the user. The content selected for the user may be based on information about the user including, without limitation, a user profile, a field of view of the user, a user interest, a contact list, a web browsing history, an advertising preference, an application installation history, a content consumption history, a product purchase history, a social media network profile of the user, a current user location, a user location history, or a combination thereof. In some examples, the content may be personalized and securely provided to a group of users as will be described below with respect to FIG. 2.

User 104 may don eyewear device 101 when viewing content (e.g., personalized content) on display system 102. Eyewear device 101 may include lenses 106, 108 positioned in front of each eye of the user to enable viewing of personalized content. User 104 may view the personalized content based on a field of view (e.g. a physical position) of user 104 relative to display system 102, a profile of user 104, or a combination thereof. In some examples, user 104 may only view the personalized content when lenses 106, 108 are within a field of view of display system 102 and/or lenses 106, 108 are a threshold distance from display system 102 (e.g., when the user is within a threshold number of meters from display system 102). As another example, user 104 may only view the personalized content when user 104 is at a certain angle and/or within a certain arc relative to a major plane (e.g., a plane of the display screen) of display system 102. As will be described below with respect to FIG. 7, eyewear device 101 may include sensors (e.g., one or more optical sensors, cameras, etc.) and systems for determining a field of view, a physical position, a location, and/or an orientation of eyewear device 101 relative to display system 102. Further, eyewear device 101 may only allow viewing of personalized content selected for display to user 104 when user 104 is looking towards display system 102. For example, when sensors of eyewear device 101 detect that the eye gaze direction of user 104 is towards display system 102, eyewear device 101 may allow user 104 to view content selected for user 104. Additionally or alternatively, display system 102 may display non-selected content (e.g., video content not directed to user 104) to others that are not wearing eyewear device 101 but are within a field of view of display system 102.

Eyewear device 101 may allow user 104 to view selected content on display system 102 by controlling the opacity (e.g., a level of transparency) of right lens 106 and left lens 108. For example, eyewear device 101 may control right lens 106 and/or left lens 108 to be transparent when display system 102 is displaying content selected for user 104 and user 104 is in the field of view of display system 102. Eyewear device 101 may control lens 106 and/or lens 108 to be opaque when display system 102 is displaying content not selected for user 104.

Figure 2:
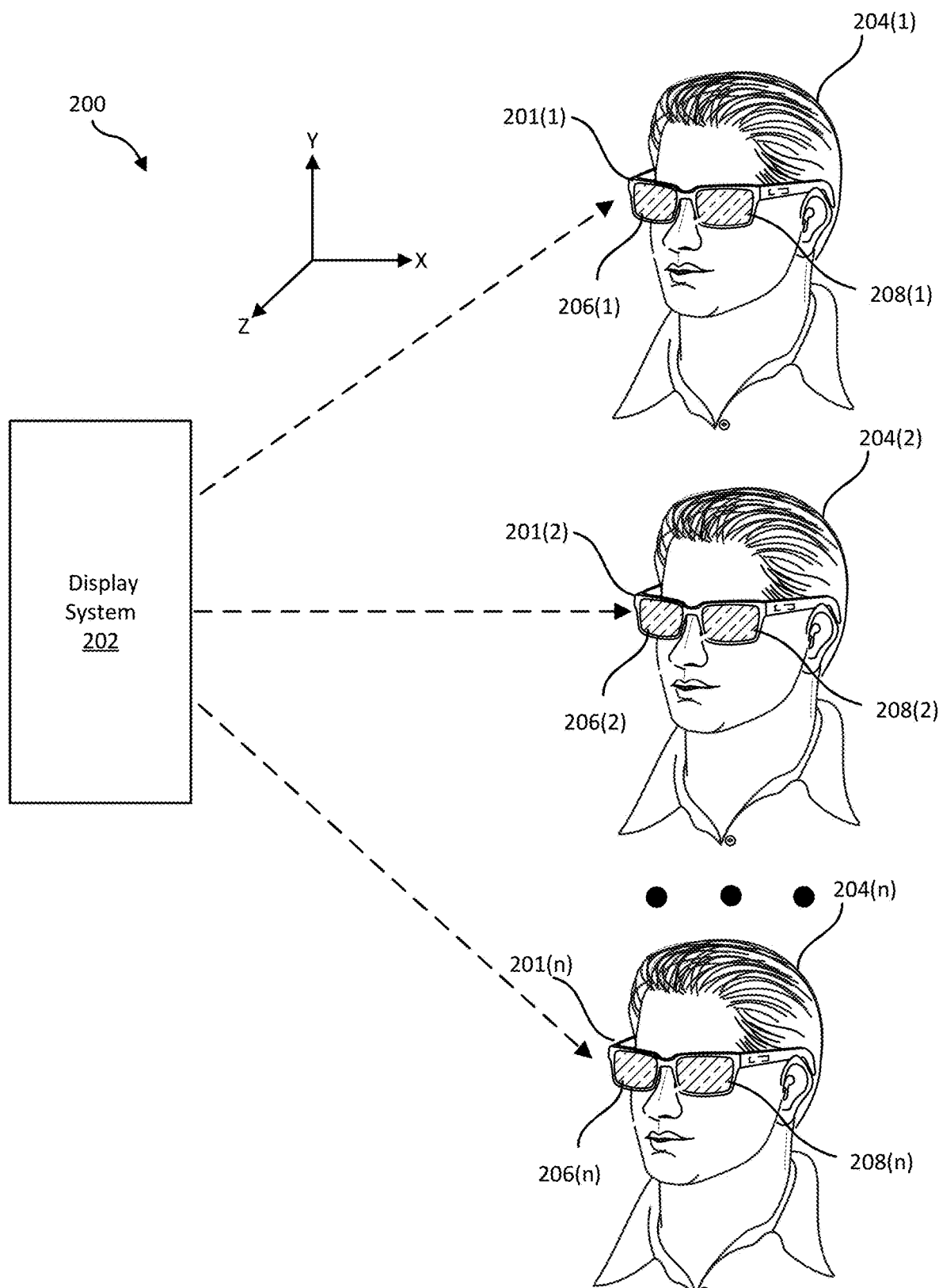
FIG. 2 illustrates an example system for synchronizing multiple eyewear devices with a display according to at least one embodiment of the present disclosure.

FIG. 2 illustrates a system 200 for providing content (e.g., personalized content) to multiple viewers (e.g., multiple users) via multiple eyewear devices. Similar to the methods of providing personalized content to a user as described with respect to system 100, system 200 provides personalized content to multiple users when the users are within the field of view of display system 202. System 200 may provide personalized content to any number of users (e.g. n users) donning eyewear devices. Each user 204(1), 204(2), . . . 204(n), donning eyewear devices 201(1), 201(2), . . . 201(n), respectively, may be able to view unique and personalized content displayed on display system 202 when each user 204(1), 204(2), . . . 204(n) is within a field of view of display system 202. System 200 may provide confidential viewing of video content (e.g., 2D or 3D video) on display system 202 by time multiplexing the displaying of the video content. Each user 204(1), 204(2), and 204(n) donning eyewear devices 201(1), 201(2), and 201(n) respectively, may view the unique and personalized video content within the field of view of display system 202 confidentially without risking the possibility of viewing by others. The personalized content may be viewed only by those viewing the content through the time-synchronized eyewear devices. As will be described below with respect to FIG. 5, display system 202 may display different content selected for each user 204(1), 204(2), and 204(n) during different time slots. Eyewear devices 201(1), 201(2), and 201(n), may each have a communications device that allows display system 202 to communicate frame timing with right lenses 206(1), 206(2), 206(n) and left lenses 208(1), 208(2), 208(n) in order to synchronize the lenses to the displayed content.

Each user 204(1), 204(2), . . . 204(n), may view their personalized content based on the field of view (e.g., physical location and/or orientation) of eyewear devices 201(1), 201(2), . . . 201(n) relative to display system 202. For example, when user 204(1) is within a threshold distance from display system 202, user 204(1) may view selected content while users 204(2) and 204(n) may not view the content selected for user 204(1). As another example, user 204(2) may view selected content when user 204(2) is at a certain viewing angle and/or within a certain arc relative to the major plane of display system 202, while users 204(1) and 204(n) may not view the content selected for user 204(2). The quality of the displayed content may be based on a horizontal and/or vertical viewing angle of the user relative to display system 202. For example, user 204(2) may be oriented orthogonally to the major plane of display system 202, while users 204(1) and 204(n) may be oriented away from an axis orthogonal to the major plane of display system 202. When 3D stereoscopic content is displayed, display system 202 may personalize the content to the viewing angle of the user such that the quality of the displayed 3D image is optimized for the user's viewing angle. In some examples, display system 202 and/or the eyewear device may also determine a viewing distance (e.g., a distance from the user to display system 202) and personalize the 3D content for maximum image quality based on the viewing distance.

Further, eyewear devices 201(1)-201(n) may only allow viewing of personalized content selected for display to users 204(1)-204(n) when users 204(1)-204(n) are looking towards (e.g., gazing at) display system 202 and are within the field of view of display system 202. For example, when sensors (e.g., eye gaze detector 725 of FIG. 7) of eyewear devices 201(1)-201(n) detect that the eye gaze direction of the respective user is towards display system 202, eyewear devices 201(1)-201(n) may allow the respective user to view the selected content. Additionally or alternatively, display system 202 may display content to a user based on the eye gaze direction of the user and the orientation of the user relative to display system 202. By basing the content on both eye gaze direction and user orientation, display system 202 may increase the quality of stereoscopic 3D images presented to the user. In some examples, a user may be looking at a specific area of display system 202 (e.g., a specific quadrant, an area that includes text, etc.). Embodiments may include determining the user eye gaze is towards a specific area of display system 202 and the content displayed may be personalized to the user based on the specific display area the user is looking at. Additionally or alternatively, display system 202 may display non-selected content (e.g., video content not directed to a selected user, video content selected for other user(s), etc.) to others who are not wearing eyewear devices but are within a field of view (e.g., a viewing range) of display system 202. For example, display system 202 may display 2D content to users within viewing range that are not wearing eyewear devices and also display 3D content to users 204(1), 204(2), . . . 204(n).

Eyewear devices 201(1)-201(n) may allow users 204(1)-204(n) to view selected content on display system 202 by controlling the opacity of right lenses 206(1)-206(n) and left lenses 208(1)-208(n) when right lenses 206(1)-206(n) and left lenses 208(1)-208(n) are within the field of view of display system 202. For example, eyewear device 201(1) may control right lens 206(1) and/or left lens 208(1) to be transparent (e.g., pass display content through right lens 206(1) and/or left lens 208(1)) when display system 202 is displaying content selected for user 204(1) while eyewear devices 201(2) and 201(n) may control right lenses 206(1), 206(n) and/or left lens 208(1), 208(n) respectively to be opaque, thereby preventing users 204(2) and 204(n) from viewing the content selected for user 204(1).

In some examples, the content may be personalized and securely provided to a group of users that are within the field of view of display system 202. The users within a group may be chosen based on a field of view of the users, a common property, a profile, a context, or a combination thereof. The common property may include, without limitation, information about the users, a physical position of the users, a physical location of the users (e.g., users who are located close together), an orientation of the users, an eye gaze direction of the users, a user profile (e.g., an interest, a contact list, a web browsing history, an advertising preference, an application installation history, a content consumption history, a product purchase history, etc.), a type of location of the users (e.g., a mall or sporting venue), a brand (e.g., a clothing brand) associated with the users, a time of day that the users view the content, recent activities (e.g., dining, sports, etc.) of the users, a presence of other users (e.g., friends, family, colleagues, etc.) in proximity to the display device, or a combination thereof. Users 204(1) and 204(2) may represent a group of users that have a common attribute and are provided with the same selected content. For example, users 204(1) and 204(2) may have a common interest in football and may both be provided with the same selected content containing football when users 204(1) and 204(2) are within the field of view of display system 202.

In some examples, display system 202 may be physically located in an area open to many users. Display system 202 may be physically located in a public area such as a shopping mall, a sports arena, an urban street, a park, a business, a storefront, an entertainment venue, a theme park, a gaming event, a restaurant, a conference venue, a tourist area, a cruise ship, a recreation area, a school, a cultural theater, a commercial event, a trade show, a marketing event, a transportation system, etc. Display system 202 may be any type of display system including, without limitation, a projector, a light emitting diode display, a television, a monitor, a digital light processing display, a plasma display, a liquid crystal display, or a combination thereof. Further, the content may be projected onto any type of display surface including, without limitation, a glass sheet, a semi-transparent mesh screen, a wall, a ceiling, etc. As display system 202 may be physically located in a public area, many users may come in and out of the field of view of display system 202. System 200 may determine and keep track of users coming within the field of view of display system 202. As a new user, for example user 204(1), comes into the field of view of display system 202, system 200 may select the content to be displayed to the new user based on information about the user (e.g., a profile of the user). A communication device within display system 202 may communicate frame timing information (e.g., wireless synchronization information) to a communication device (e.g. communication transceiver 705 of FIG. 7) within eyewear device 201(1). As will be described in more detail with respect to FIGS. 5 and 6, the frame timing information received wirelessly by eyewear device 201(1) may synchronize right lens 206(1) and/or left lens 208(1) with a frame refresh rate of display system 202 such that display system 202 alternates between displaying one or more frames of the content selected for display to user 204(1) and one or more frames of the content not selected for display to user 204(1). Right lens 206(1) and/or left lens 208(1) may be synchronized with the frame refresh rate of display system 202 to be transparent when frames of the content selected for display to user 204(1) are being displayed. Right lens 206(1) and/or left lens 208(1) may also be synchronized with the frame refresh rate of display system 202 to be opaque when frames of the content not selected for display to user 204(1) are being displayed. Display system 202 may stop displaying selected content to user 204(1) when user 204(1) leaves the vicinity of display system 202, is outside the field of view of display system 202, is no longer looking at display system 202 (e.g., user 204(1) eye gaze is no longer in the direction of display system 202), or user 204(1) requests the selected content no longer be displayed.

In some examples, display system 202 may or may not have a limitation as to the number of users that may be supported by displaying unique selected content. In order to maximize the number of users, display system 202 may modify properties and/or parameters of the displayed content. Modifying parameters of the displayed content to maximize the number of users may create tradeoffs in display system quality. For example, increasing the number of users viewing unique selected content may decrease the brightness of the displayed content to each user. In order to maintain viewing quality of the displayed content, display system 202 may increase the display frame rate so that the increased number of frames per time period may be divided among the users. For example, if display system 202 is displaying 60 frames per second and is providing selected content to two users, each user is viewing 30 frames per second. If a third user's eyewear device connects to display system 202, then the frame rate may be increased to 90 frames per second. If a fourth user's eyewear device connects to display system 202, then the frame rate may be increased to 120 frames per second so that each user views the selected content at 30 frames per second. The frame rate may be further divided among and/or increased for additional users. Display system 202 may increase the brightness of the display when displaying content to additional users in order to compensate for the perceived reduction in brightness caused by dividing the frame rate among multiple users.

In some examples, the frame rates may be different for different users. For example, certain users may view selected content that requires higher frames rates (e.g., fast action sports) for satisfactory display quality, while other users may view selected content that requires slower frames rates for satisfactory display quality and/or based on capabilities of a particular eyewear device. Display system 202 may also allocate different frame rates to different users based on the requirements of the selected content.

Figure 3:
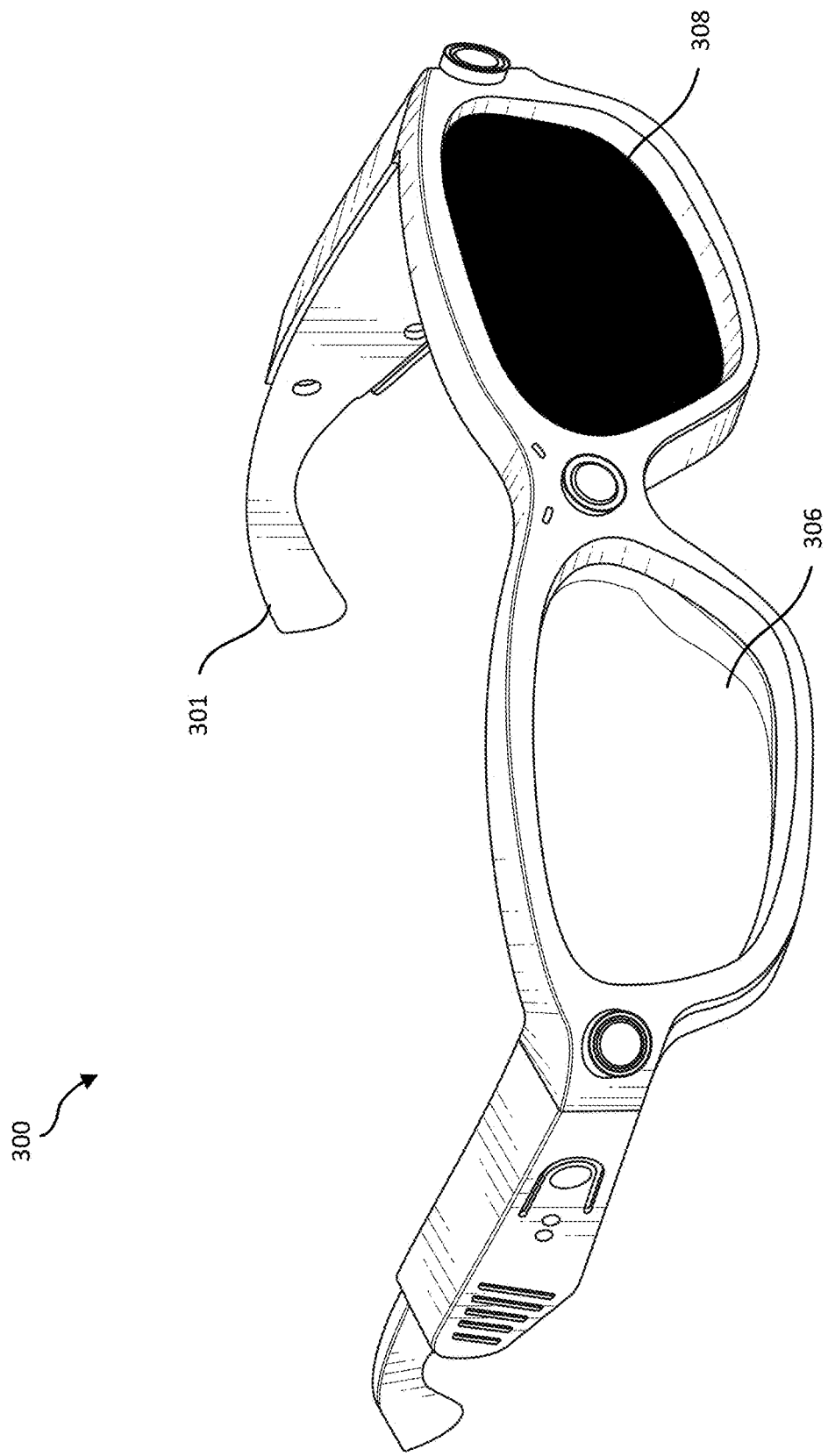
FIGS. 3 and 4 illustrate an example of an eyewear device including right and left lenses according to at least one embodiment of the present disclosure.
Figure 4:
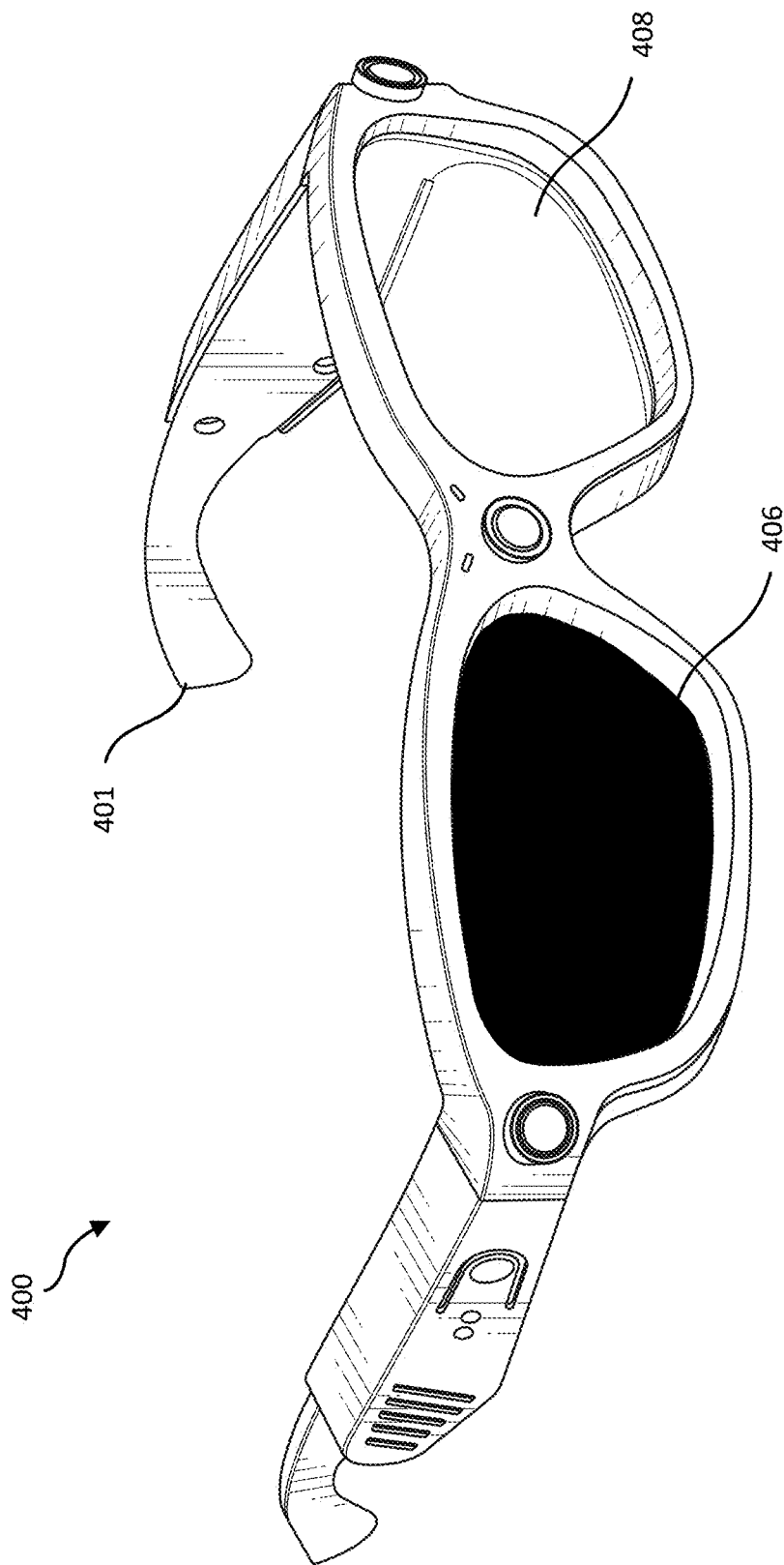

FIG. 3 illustrates eyewear device 300 including right lens 306 and left lens 308. FIG. 4 illustrates eyewear device 400 including right lens 406 and left lens 408. Right lenses 306, 406 and left lenses 308, 408 may have an opacity that ranges from transparent to opaque. When right lenses 306, 406 or left lenses 308, 408 are transparent, light emitted from display system 202 may pass through the lens to the eye of the user allowing the user to view the images (e.g., the selected content) on display system 202. When right lenses 306, 406 or left lenses 308, 408 are opaque, light emitted from display system 202 may be partially or fully blocked from passing through the lens to the eye of the user preventing the user from viewing the images on display system 202. The opacity of right lenses 306, 406 and left lenses 308, 408 may be variable and independently controlled. FIG. 3 shows eyewear device 300 when right lens 306 is transparent and left lens 308 is opaque, thereby allowing selected content to be viewed through right lens 306 when right lens 306 is in the field of view of display system 202. FIG. 4 shows eyewear device 400 when right lens 406 is opaque and left lens 408 is transparent, thereby allowing selected content to be viewed through left lens 408 when left lens 408 is in the field of view of display system 202. Right lenses 306, 406 and left lenses 308, 408 may be controlled such that the opacity of the entire lens area is a uniform level or the opacity may be controlled to different levels on different areas of the lens. The opacity of right lenses 306, 406 and left lenses 308, 408 may be controlled using any method. Right lenses 306, 406 and left lenses 308, 408 may include a material that changes opacity upon application of a voltage or current. For example, right lenses 306, 406 and left lenses 308, 408 may include a liquid crystal material that changes opacity through polarization of the molecules or particles inside the liquid crystal material. Further, right lenses 306, 406 and left lenses 308, 408 may include an internal display, such as the near eye display described below with respect to the eyewear of FIG. 10, that displays content to the user donning eyewear devices 300, 400. Eyewear device 300 and eyewear device 400 may include a wearable frame 301, 401 respectively, that is dimensioned to enable the user to don the eyewear device.

In some examples, right lenses 306, 406 and left lenses 308, 408 may include a material and/or components that filters light (e.g., display content) based upon a polarization angle of the light received at the lenses. For example, right lenses 306, 406 and left lenses 308, 408 may have active filters configured to set a polarization angle based on wireless synchronization information received from a display device. When a polarization angle is set in right lenses 306, 406 and left lenses 308, 408, only light that has substantially the same polarization may pass through the lens. The polarization angle may be controlled by a processor (e.g., processor 703 of FIG. 7). A display device that displays content personalized to a viewer (display device 102, 202, 602, or 702) may display the content with a set polarization angle (e.g., 45 degrees). When right lenses 306, 406 and left lenses 308, 408 have a polarization angle set to match the display device (e.g. 45 degrees), the display content may pass through the lens to be viewed by the user when right lenses 306, 406 and left lenses 308, 408 are in the field of view of display system 202. Lenses that are not controlled to match the display device (e.g. lenses set orthogonally at 135 degrees) may partially or fully block the display content such that the user may not view the display content. The system may synchronize the frame rate and polarization angle of the display device with the eyewear device based on the wireless synchronization information such that display content intended for a specific user passes through one or both of the lenses. Further, the system may disable the polarization filter, such that all visible light passes through the lenses.

FIG. 5 illustrates an example of the timing of a display device displaying content frames to a user. A display device may alternate between displaying a content frame selected for display to user 504(1) and displaying a content frame selected for display to user 504(n). Although FIG. 5 shows an example of personalized content being displayed for 2 users within the field of view of the display device, the present embodiment is not so limited. As described above, the display device may display personalized content to any number of users within the field of view of the display device.

Eyewear device 501(1) may include a communication device, such as communication transceiver 705 of FIG. 7, that synchronizes right lens 506(1) and left lens 508(1) with a refresh rate of the display device. Eyewear device 501(n) may also include a communication device, such as communication transceiver 705 of FIG. 7, that synchronizes right lens 506(n) and left lens 508(n) with a refresh rate of the display device.

The frame refresh rate may be a rate (e.g., a number of times per second) that the display device changes a displayed image. Each image may be displayed for a time period 515. For example, if the refresh rate is 60 Hz (e.g., 60 frames per second), time period 515 is $\frac{1}{60}^{th}$ of a second. The display device may display the personalized content images by sequentially displaying images in synchronization with the lenses when the lenses are within the field of view of the display device.

Frame sequence 514 represents a sequence of time slots during which personalized content is displayed to a user in the field of view of the display device. For example, during time slot 516, the display device displays right image 510(1) while synchronizing right lens 506(1) to be transparent and left lens 508(1) to be opaque. During time slot 517, the display device displays right image 510(n) while synchronizing right lens 506(n) to be transparent and left lens 508(n) to be opaque. During time slot 518, the display device displays left image 512(1) while synchronizing right lens 506(1) to be opaque and left lens 508(1) to be transparent. During time slot 519, the display device displays left image 512(n) while synchronizing right lens 506(n) to be opaque and left lens 508(n) to be transparent. During time slots 517 and 519, right lens 506(1) and left lens 508(1) may be synchronized to be opaque, thereby preventing user 504(1) and other unauthorized users from viewing the personalized content displayed for user 504(n). Similarly, during time slots 516 and 518, right lens 506(n) and left lens 508(n) are synchronized to be opaque, thereby preventing user 504(n) and other unauthorized users from viewing the personalized content displayed for user 504(1). As shown in FIG. 5, the sequence described above repeats during time slots 520-523 with the interlaced displaying of left and right images (e.g., personalized content) to each of users 504(1) and 504(n). As additional authorized users donning eyewear devices come into the field of view of the display, frame sequence 514 will be further divided among the additional users.

As described below with respect to FIG. 6, the displayed content may be 2D or 3D content. Eyewear devices 501(1) and 501(n) may be capable of allowing users 504(1) and 504(n) of viewing 2D and/or 3D content when 504(1) and 504(n) are in the field of view of the display device. When 3D content is displayed, the display device may display an image for the left eye of the user when left lens 508(1) is transparent while blocking the right eye of the user when right lens 506(1) is opaque. During the next time slot intended for the user, the display device displays the right-eye image when right lens 506(1) is transparent while blocking the left eye when left lens 508(1) is opaque. By repeating this left/right image sequencing rapidly, user 504 (1) may perceive a fusion of the two stereoscopic images into a single 3D image. The display device may switch between displaying 2D content and 3D content. The display device may display 2D content to users that are not wearing eyewear devices and may display 3D content to users that are wearing eyewear devices. Eyewear devices 501(1) and 501(n) may alert the display device via a communication device to display 3D content when eyewear devices 501(1) and 501(n) are in a field of view (e.g. a viewing range) of the display device.

FIG. 6 illustrates display device 602 displaying 3D content to eyewear device 601. As described above, display device 602 may alternate between displaying a content frame selected for display to a user wearing an eyewear device and displaying a content frame selected for display to another user wearing an eyewear device when the user is within the field of view of display device 602. Additionally or alternatively, display device 602 may alternate between displaying a frame of 3D content selected for display to the left eye of a user wearing eyewear device 601 and displaying a frame of 3D content selected for display to the right eye of the user wearing eyewear device 601. As described above with respect to FIG. 5, display device 602 may display selected 3D content to users that are wearing eyewear device 601 and are in the field of view of display device 602. The selected 3D content may be displayed based on a physical position (e.g., a physical location, an orientation, etc.) of eyewear device 601 relative to display device 602. Display device 602 may display content frame 610(1) (e.g., a 3D content frame personalized for the user of eyewear device 601) while communicating with eyewear device 601 to synchronize right lens 606 to be transparent and left lens 608 to be opaque while displaying content frame 610(1). During a subsequent time slot that is based on the frame refresh rate, display device 602 may display content frame 610(2) while communicating with eyewear device 601 to synchronize right lens 606 to be opaque and left lens 608 to be transparent while displaying content frame 610(1). The process of alternating between displaying left and right images is repeated at a rate that may be undetectable by the viewer. When the individual left and right images being viewed by each eye reaches the visual cortex, the user's brain may automatically put these images together and interpret the content as 3D content. Display device 602 may display 3D content selected for display to another user. As a non-limiting example in FIG. 6, display device 602 may display selected content to two users. During a subsequent time slot, display device 602 may display content frame 610(3) while communicating with the eyewear device of the other user to synchronize the right lens of the other user's eyewear to be transparent and the left lens to be opaque. During a subsequent time slot, display device 602 may display content frame 610(4) while communicating with the eyewear device of the other user to synchronize the left lens of the other user's eyewear to be transparent and the right lens to be opaque. The sequencing may then continue to display content frame 610(5) and 610(6) to display right and left images respectively to the user of eyewear device 601.

FIG. 7 is a block diagram of a system 700 for displaying personalized content to a user based on the content being in the field of view of eyewear worn by the user. Referring to FIG. 7, a display device 702 may display content (e.g., personalized content) to an eyewear device 701. Display device 702 may include a wireless communications device (e.g., cellular, Bluetooth™, WiFi, NFC, infrared, etc.) for communicating control signals to communications transceiver 705 of eyewear device 701. The control signals communicated between eyewear device 701 and display device 702 may include wireless synchronization information that includes, without limitation, frame synchronization information to synchronize the opacity control of left lens 708 and/or right lens 706, field of view information, physical position information (e.g., physical location, orientation) describing a physical position of eyewear device 701 relative to display device 702, information about a user wearing eyewear device 701, a profile of a user wearing eyewear device 701, a context in which a user views content on display device 702, information about the personalized content displayed on display device 702, or a combination thereof. Display device 702 may further communicate over a network (e.g. a wireless network) to a server 728 or a group of servers to receive the personalized content for display to a user(s) and/or information (e.g., a field of view information, a user profile, user authentication, etc.) about the user(s) viewing content on display device 702.

Eyewear device 701 may include a processor 703 (e.g., a microcontroller, a central processing unit, a digital signal processor, etc.) and a memory 704. Processor 703 may execute instructions stored in memory 704 that implement the methods of the present disclosure. Processor 703 may execute instructions that synchronize left lens 708 and/or right lens 706 with display device 702 as described above with respect to FIGS. 1-6. Processor 703 may execute instructions that determine a field of view (e.g., a physical position) of eyewear device 701 based on an output of a sensor. Eyewear device 701 may include at least one sensor (e.g., a camera, an image capture device, an inertial measurement unit, a simultaneous localization and mapping (SLAM) camera) that determines a field of view of eyewear device 701 with respect to display device 702. For example, eyewear device 701 may include a left camera 720 positioned a left side of eyewear device 701 and a right camera 722 positioned on a right side of eyewear device 701 that may determine the field of view of eyewear device relative to display device 702. Processor 703 may execute instructions including a SLAM algorithm stored in memory 704 that uses image data from left camera 720 and right camera 722 to identify features of display device 702 that are visible from an initial position of eyewear device 701. Processor 703 may determine the physical position of a point on eyewear device 701 relative to the features of display device 702, such as a field of view, a distance, a location, and an orientation (e.g., an angle) between eyewear device 701 and display device 702. Processor 703 may then begin synchronizing shutters of eyewear device 701 based on the relative position of eyewear device 701 and display device 702. Processor 703 may also execute instructions that tracks movement of eyewear device 701 using motion data captured by inertial measurement unit (IMU) 724. For example, as eyewear device 701 moves, IMU 724 may determine a magnitude and direction of eyewear device 701 movement and continually determine the field of view, the distance, and orientation between eyewear device 701 and display device 702.

Additionally or alternatively, eyewear device 701 may use the output of image sensor 718 (e.g., a camera) to determine a field of view (e.g., a physical position) of eyewear device 701 with respect to display device 702. Image sensor 718 may be mounted on eyewear device 701 to capture images of a surrounding environment including images of display device 702. The captured images of display device 702 may be used to determine the field of view information (e.g., location, orientation, etc.) of eyewear device 701 with respect to display device 702. Processor 703 may execute instructions including an artificial intelligence algorithm stored in memory 704 that uses image data from image sensor 718 to determine the field of view information. Eyewear device 701 may communicate the field of view information (e.g., location, orientation, etc.) to display device 702 to initiate synchronization of shutter lenses of eyewear device 701 with display device 702 and/or to otherwise control the display of personalized content. Additionally or alternatively, display device 702 may use an output of a sensor to determine the field of view information associated with eyewear device and use that field of view information to control the display of personalized content to the user of eyewear device 701.

In some examples, eyewear device 701 may include an eye gaze direction sensor such as eye gaze detector 725. Eye gaze detector 725 may generate eye gaze information that indicates where a user donning eyewear device 701 is looking (e.g., a field of view). Eye gaze detector 725 may determine the direction of the user's eye gaze in three-dimensional space (e.g., line of sight). Processor 703 may execute instructions stored in memory 704 that determine the user's line of sight is directed towards display device 702. Eyewear device 701 may communicate the gaze direction information to display device 702 to control the display of personalized content. For example, when eyewear device 701 communicates information to display device 702 indicating the user is looking at display device 702, personalized content may be displayed for viewing by the user when the user is in the field of view of display device 702.

Additionally or alternatively, a user may view content (e.g., artificial-reality content, personalized content, etc.) on an internal display 712 (e.g., a retina-scanning waveguide) of eyewear device 701. Internal display 712 may be a near-eye display such as the near-eye display described below with respect to the eyewear of FIG. 10, that includes a left display device and a right display device in front of a user's eyes. The left and right displays of internal display 712 may act together and/or independently to present personalized content to the user. When using internal display 712 to display content, the opacity of left lens 708 and right lens 706 may be controlled to reduce the amount of external light entering eyewear device 701 thereby increasing the brightness and/or contrast of internal display 712. Additionally or alternatively, content displayed on display device 702 may be coordinated with content displayed on internal display 712. For example, the frame refresh rate of display device 702 may be synchronized to internal display 712, left lens 708, and right lens 706. When left lens 708 and/or right lens 706 are opaque, internal display 712 (e.g., a waveguide display) may display content internally to the user. Internal display 712 may also display content when left lens 708 and/or right lens 706 are transparent, allowing the user to view personalized content on display device 702 and content on internal display 712. The user may view both the personalized content displayed on display device 702 and the content on internal display 712 simultaneously such that the content viewed on internal display 712 augments, overlays, and/or enhances the content viewed on display device 702. Additionally or alternatively, the content viewed on display device 702 may augment, overlay, and/or enhance the content viewed on internal display 712. In some examples, left lens 708 and right lens 706 may include an adjustment mechanism (e.g., a liquid lens) to modify the optical power provided for an image originating from internal display 712 without modifying the optical power provided for an image originating from display device 702. In some examples, this may allow left lens 708 and right lens 706 to reduce, minimize, or eliminate accommodation-vergence conflict caused by internal display 712 by modifying the apparent accommodation distance of images on display device 702 while minimizing any distortion to images shown via display device 702.

Eyewear device 701 may include speakers 710. Speakers 710 may be audio transducers that reproduce audio content for consumption by the user. Speakers 710 may reproduce personalized audio content for the user. Display device 702 may provide combined audio and video content (e.g., sports, games, music, advertisements, etc.) personalized for the user when the user is in the field of view of display device 702. The personalized audio content may be communicated to eyewear device 701 from display device 702 and may be reproduced for consumption by the user in synchronization with the personalized video content displayed to the user.

Eyewear device 701 may include microphone 709. Microphone 709 may include an audio transducer for sensing sound in an ambient environment to eyewear device 701. Microphone 709 may sense spoken words from the user such as commands related to the display of personalized content. The spoken commands may be communicated to display device 702 and/or a server to control the display of personalized content. In some examples, the spoken commands may be communicated to a server that executes an audio-based artificially-intelligent assistant (e.g., a virtual assistant). The virtual assistant may execute the commands and instruct display device 702 to display personalized content consistent with the commands.

FIG. 8 illustrates an example of physical construction and component placement of eyewear device 801. Referring to FIG. 8, eyewear device 801 may be dimensioned to enable an intended user to don eyewear device 801. Eyewear device 801 may include temples 823 and bridge 824 such that a user may comfortably don eyewear device 801 with a left lens 808 positioned in front of a left eye of the intended user and a right lens 806 positioned in front of a right eye of the intended user. The center section between the top of left lens 808 and right lens 806 may include image sensor 818 positioned to sense images in the surrounding area and determine when the user is in the field of view of a display device. Microphone 809 may also be positioned in the center section to sense the speech of the user and audio from the surrounding area. Speakers 810 may be positioned on a rear section of temples 823 next to the user's ears to reproduce selected audio content. Left camera 820 and right camera 822 may be positioned at the hinge areas of lenses 806 and 808 such that the physical separation supports obtaining stereoscopic views of the ambient environment enabling determination of the field of view of the display device.

FIG. 9 is a flow diagram illustrating a method 900 of viewing content (e.g., personalized content) via an eyewear device when the user is in the field of view of a display device. At operation 910, the method may include capturing, via an optical device, a scene within a field of view of a lens. The systems described herein may capture a scene in any suitable way. For example, the optical device may capture still images, a video stream, depth information, and/or any other information about a scene within a field of view of a lens. In some embodiments, the term "scene" generally refers to any view of a real-world location, all of a field of view of a lens, a portion of a field of view of a lens, etc.

At operation 920, the method may include determining, by a controller and by evaluating the scene, that display content of a display device is within a field of view of the lens. The controller may determine that the display content is within field of view of the lens in any suitable manner. For example, the controller may determine that the display content is within the field of view of the lens by using computer vision to identify a display that displays the content in the scene, by identifying a code (e.g., a QR code) in the scene that is associated with the content, etc.

At operation 930, the method may include receiving, by a communication device, wireless synchronization information for the display content. The communication device may receive the wireless synchronization information in any suitable manner. For example, the communication device may receive the wireless synchronization information via WIFI, BLUETOOH, near-field communication (NFC), etc. In some embodiments, the communication device may begin scanning for or otherwise attempting to identify the wireless synchronization information in response to the controller determining that the display content is within the field of view of the lens. In other embodiments, the communication device may continuously or periodically scan for or otherwise attempt to identify the wireless synchronization information.

At operation 940, the method may include selectively allowing, in response to determining that the display content is within the field of view of the lens, the display content to pass through the lens based on the wireless synchronization information. The display content may be selectively allowed to pass through the lens in any suitable manner. As described above, the display content may be selectively allowed to pass through the lens by synchronizing a shutter and/or polarization of the lens with certain frames displayed by a display device.

Accordingly, the present disclosure includes devices, systems, and methods that may be employed to improve and provide alternative modes of displaying content (e.g., personalized content) to a single viewer and/or multiple viewers from a single display. For example, a display device may display 3D artificial reality content to a single viewer and/or multiple users from a single display by displaying the content during time slots when lenses of the eyewear device worn by the users are transparent and the user is in the field of view of the display device. The lenses may be opaque during time slots when content is displayed for other users. The content may be personalized to users that are associated with one another. For example, multiple users may be playing a game associated with the displayed content. Each of the game players may view content personalized for the game player's viewpoint (e.g., a field of view, an orientation, an eye gaze direction, a location, etc.) relative to the display. In some examples, a user may switch their viewpoint to another user's viewpoint by switching the synchronization of the lenses to be synchronized with lenses of the other user. The personalized content of the game players may be based on a game player's team, role, character, skill level, interests, game selection, past game experiences, state of the game, number of game players, game time remaining on the clock, etc.

In some examples, the personalized content may be based on factors including, without limitation, a profile of the user, a social media network profile of the user (e.g., friends, colleagues, groups, political affiliation, etc.), biometrics of the user, an external environment of the display (e.g., high temperatures may drive cold drink ads to be displayed), a type of display venue (e.g., a shopping mall venue may display ads to local stores and/or restaurants), a video content subscription service, etc. The profile of the user may include an interest (e.g., a hobby, a sport) of the user, a contact list (e.g., friends) associated with the user, a web browsing history of the user, a physical location history of the user, an advertising preference of the user, an application installation history of the user, a content consumption history of the user, and a product purchase history of the user. In some examples, the personalized content may be based on the field of view of the user and the context in which the user views the content. For example, the context may include a type of location (e.g., a shopping mall, a restaurant, a casino, a sporting venue) of the display device, a brand (e.g., a clothing brand, an automobile brand, a beverage brand) associated with the location of the display device, a type of retailer (e.g., a coffee shop, a department store) associated with the location of the display device, a location of the user (e.g., approaching a retailer), a time of day that the user views the content, a recent activity (e.g., online shopping) of the user, a presence of other users (e.g., friends, family, colleagues) in proximity to the display device, or a type of activity (e.g., dining, gaming, shopping) of other users in proximity to the display device. The disclosed methods of providing personalized content to a user may create a more compelling content consumption experience. For example, a user's profile may include information indicating that the user favors a particular brand of clothing. While the user is shopping in a mall that includes a display device as described above, the display device may display content (e.g., advertisement, sales promotion) that is related to the favored clothing brand to the user donning eyewear that is in the field of view of the display content. Further, the content may be displayed in the context of the location of the display device (e.g., located near a retailer that sells the favored clothing brand). As another example, a user's profile may include information indicating that the user is a fan of a particular sports team. While the user is dining in a venue that includes a display device as described above, the display device may display content such as highlights of a game played by the favored sports team to the user donning eyewear. Further, the content may be displayed in the context of the time at which the content was displayed (e.g., game highlights displayed from the most recent game of the sports team). As another example, a user's profile may include information indicating that the user is a member of a group that includes others having a shared interest (e.g., a hobby). While the user is attending an event related to the hobby in a venue that includes a display device as described above, the display device may display content related to the hobby to the user donning eyewear. Further, the content may be displayed in the context of the hobby event.

Embodiments of the present disclosure may include or be implemented in conjunction with various types of artificial-reality systems. Artificial reality is a form of reality that has been adjusted in some manner before presentation to a user, which may include, e.g., a virtual reality, an augmented reality, a mixed reality, a hybrid reality, or some combination and/or derivative thereof. Artificial-reality content may include completely generated content or generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, e.g., create content in an artificial reality and/or are otherwise used in (e.g., to perform activities in) an artificial reality.

The embodiments discussed in this disclosure may also be implemented in augmented-reality systems that include one or more NEDs. For example, as shown in FIG. 10, augmented-reality system 1000 may include an eyewear device 1002 with a frame 1010 configured to hold a left display device 1015(A) and a right display device 1015(B) in front of a user's eyes. Display devices 1015(A) and 1015(B) may act together or independently to present an image or series of images to a user. While augmented-reality system 1000 includes two displays, embodiments of this disclosure may be implemented in augmented-reality systems with a single NED or more than two NEDs.

In some embodiments, augmented-reality system 1000 may include one or more sensors, such as sensor 1040. Sensor 1040 may generate measurement signals in response to motion of augmented-reality system 1000 and may be located on substantially any portion of frame 1010. Sensor 1040 may represent a position sensor, an inertial measurement unit (IMU), a depth camera assembly, or any combination thereof. In some embodiments, augmented-reality system 1000 may or may not include sensor 1040 or may include more than one sensor. In embodiments in which sensor 1040 includes an IMU, the IMU may generate calibration data based on measurement signals from sensor 1040. Examples of sensor 1040 may include, without limitation, accelerometers, gyroscopes, magnetometers, other suitable types of sensors that detect motion, sensors used for error correction of the IMU, or some combination thereof. Augmented-reality system 1000 may also include a microphone array with a plurality of acoustic transducers 1020(A)-1020(J), referred to collectively as acoustic transducers 1020. Acoustic transducers 1020 may be transducers that detect air pressure variations induced by sound waves. Each acoustic transducer 1020 may be configured to detect sound and convert the detected sound into an electronic format (e.g., an analog or digital format). The microphone array in FIG. 10 may include, for example, ten acoustic transducers: 1020(A) and 1020(B), which may be designed to be placed inside a corresponding ear of the user, acoustic transducers 1020(C), 1020(D), 1020(E), 1020(F), 1020(G), and 1020(H), which may be positioned at various locations on frame 1010, and/or acoustic transducers 1020(1) and 1020(J), which may be positioned on a corresponding neckband 1005.

In some embodiments, one or more of acoustic transducers 1020(A)-(F) may be used as output transducers (e.g., speakers). For example, acoustic transducers 1020(A) and/or 1020(B) may be earbuds or any other suitable type of headphone or speaker.

The configuration of acoustic transducers 1020 of the microphone array may vary. While augmented-reality system 1000 is shown in FIG. 10 as having ten acoustic transducers 1020, the number of acoustic transducers 1020 may be greater or less than ten. In some embodiments, using higher numbers of acoustic transducers 1020 may increase the amount of audio information collected and/or the sensitivity and accuracy of the audio information. In contrast, using a lower number of acoustic transducers 1020 may decrease the computing power required by an associated controller 1050 to process the collected audio information. In addition, the position of each acoustic transducer 1020 of the microphone array may vary. For example, the position of an acoustic transducer 1020 may include a defined position on the user, a defined coordinate on frame 1010, an orientation associated with each acoustic transducer 1020, or some combination thereof.

Acoustic transducers 1020(A) and 1020(B) may be positioned on different parts of the user's ear, such as behind the pinna or within the auricle or fossa. Or, there may be additional acoustic transducers 1020 on or surrounding the ear in addition to acoustic transducers 1020 inside the ear canal. Having an acoustic transducer 1020 positioned next to an ear canal of a user may enable the microphone array to collect information on how sounds arrive at the ear canal. By positioning at least two of acoustic transducers 1020 on either side of a user's head (e.g., as binaural microphones), augmented-reality device 1000 may simulate binaural hearing and capture a 3D stereo sound field around about a user's head. In some embodiments, acoustic transducers 1020(A) and 1020(B) may be connected to augmented-reality system 1000 via a wired connection 1030, and in other embodiments, acoustic transducers 1020(A) and 1020(B) may be connected to augmented-reality system 1000 via a wireless connection (e.g., a Bluetooth connection). In still other embodiments, acoustic transducers 1020(A) and 1020(B) may not be used at all in conjunction with augmented-reality system 1000.

Acoustic transducers 1020 on frame 1010 may be positioned along the length of the temples, across the bridge, above or below display devices 1015(A) and 1015(B), or some combination thereof. Acoustic transducers 1020 may be oriented such that the microphone array is able to detect sounds in a wide range of directions surrounding the user wearing augmented-reality system 1000. In some embodiments, an optimization process may be performed during manufacturing of augmented-reality system 1000 to determine relative positioning of each acoustic transducer 1020 in the microphone array.

In some examples, augmented-reality system 1000 may include or be connected to an external device (e.g., a paired device), such as a neckband 1005. Neckband 1005 generally represents any type or form of paired device. Thus, the following discussion of neckband 1005 may also apply to various other paired devices, such as charging cases, smart watches, smart phones, wrist bands, other wearable devices, hand-held controllers, tablet computers, laptop computers and other external compute devices, etc.

As shown, neckband 1005 may be coupled to eyewear device 1002 via one or more connectors. The connectors may be wired or wireless and may include electrical and/or non-electrical (e.g., structural) components. In some cases, eyewear device 1002 and neckband 1005 may operate independently without any wired or wireless connection between them. While FIG. 10 illustrates the components of eyewear device 1002 and neckband 1005 in example locations on eyewear device 1002 and neckband 1005, the components may be located elsewhere and/or distributed differently on eyewear device 1002 and/or neckband 1005. In some embodiments, the components of eyewear device 1002 and neckband 1005 may be located on one or more additional peripheral devices paired with eyewear device 1002, neckband 1005, or some combination thereof.

Pairing external devices, such as neckband 1005, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1000 may be provided by a paired device or shared between a paired device and an eyewear device, thus reducing the weight, heat profile, and form factor of the eyewear device overall while still retaining desired functionality. For example, neckband 1005 may allow components that would otherwise be included on an eyewear device to be included in neckband 1005 since users may tolerate a heavier weight load on their shoulders than they would tolerate on their heads. Neckband 1005 may also have a larger surface area over which to diffuse and disperse heat to the ambient environment. Thus, neckband 1005 may allow for greater battery and computation capacity than might otherwise have been possible on a standalone eyewear device. Since weight carried in neckband 1005 may be less invasive to a user than weight carried in eyewear device 1002, a user may tolerate wearing a lighter eyewear device and carrying or wearing the paired device for greater lengths of time than a user would tolerate wearing a heavy stand-alone eyewear device, thereby enabling users to more fully incorporate artificial-reality environments into their day-to-day activities.

Neckband 1005 may be communicatively coupled with eyewear device 1002 and/or to other devices. These other devices may provide certain functions (e.g., tracking, localizing, depth mapping, processing, storage, etc.) to augmented-reality system 1000. In the embodiment of FIG. 10, neckband 1005 may include two acoustic transducers (e.g., 1020(1) and 1020(J)) that are part of the microphone array (or potentially form their own microphone subarray). Neckband 1005 may also include a controller 1025 and a power source 1035.

Acoustic transducers 1020(1) and 1020(J) of neckband 1005 may be configured to detect sound and convert the detected sound into an electronic format (analog or digital). In the embodiment of FIG. 10, acoustic transducers 1020(1) and 1020(J) may be positioned on neckband 1005, thereby increasing the distance between neckband acoustic transducers 1020(1) and 1020(J) and other acoustic transducers 1020 positioned on eyewear device 1002. In some cases, increasing the distance between acoustic transducers 1020 of the microphone array may improve the accuracy of beamforming performed via the microphone array. For example, if a sound is detected by acoustic transducers 1020(C) and 1020(D) and the distance between acoustic transducers 1020(C) and 1020(D) is greater than, e.g., the distance between acoustic transducers 1020(D) and 1020(E), the determined source location of the detected sound may be more accurate than if the sound had been detected by acoustic transducers 1020(D) and 1020(E).

Controller 1025 of neckband 1005 may process information generated by the sensors on neckband 1005 and/or augmented-reality system 1000. For example, controller 1025 may process information from the microphone array that describes sounds detected by the microphone array. For each detected sound, controller 1025 may perform a direction-of-arrival (DOA) estimation to estimate a direction from which the detected sound arrived at the microphone array. As the microphone array detects sounds, controller 1025 may populate an audio data set with the information. In embodiments in which augmented-reality system 1000 includes an inertial measurement unit, controller 1025 may compute all inertial and spatial calculations from the IMU located on eyewear device 1002. A connector may convey information between augmented-reality system 1000 and neckband 1005 and between augmented-reality system 1000 and controller 1025. The information may be in the form of optical data, electrical data, wireless data, or any other transmittable data form. Moving the processing of information generated by augmented-reality system 1000 to neckband 1005 may reduce weight and heat in eyewear device 1002, making it more comfortable to the user.

A power source 1035 in neckband 1005 may provide power to eyewear device 1002 and/or to neckband 1005. Power source 1035 may include, without limitation, lithium ion batteries, lithium-polymer batteries, primary lithium batteries, alkaline batteries, or any other form of power storage. In some cases, power source 1035 may be a wired power source. Including power source 1035 on neckband 1005 instead of on eyewear device 1002 may help better distribute the weight and heat generated by power source 1035.

FIG. 11 is a perspective view of a user 1110 interacting with an augmented-reality system 1100. In this example, user 1110 may wear a pair of augmented-reality glasses 1120 that have one or more displays 1122 and that are paired with a haptic device 1130. Haptic device 1130 may be a wristband that includes a plurality of band elements 1132 and a tensioning mechanism 1134 that connects band elements 1132 to one another.

One or more of band elements 1132 may include any type or form of actuator suitable for providing haptic feedback. For example, one or more of band elements 1132 may be configured to provide one or more of various types of cutaneous feedback, including vibration, force, traction, texture, and/or temperature. To provide such feedback, band elements 1132 may include one or more of various types of actuators. In one example, each of band elements 1132 may include a vibrotactor configured to vibrate in unison or independently to provide one or more of various types of haptic sensations to a user. Alternatively, only a single band element or a subset of band elements may include vibrotactors.

Haptic device 1130 may include any suitable number and/or type of haptic transducer, sensor, and/or feedback mechanism. For example, haptic device 1130 may include one or more mechanical transducers, piezoelectric transducers, and/or fluidic transducers. Haptic device 1130 may also include various combinations of different types and forms of transducers that work together or independently to enhance a user's artificial-reality experience. In one example, each of band elements 1132 of haptic device 1130 may include a vibrotactor (e.g., a vibrotactile actuator) configured to vibrate in unison or independently to provide one or more of various types of haptic sensations to a user.

By way of non-limiting examples, the following embodiments are included in the present disclosure.

Example 1: A system comprising a communication device configured to receive wireless synchronization information for display content, a lens, an optical device, and a controller configured to determine that the display content is in a field of view of the lens, and in response to determining that the display content is within the field of view of the lens, cause the lens to selectively allow the display content to pass through the lens based on the wireless synchronization information.

Example 2: The system of Example 1, wherein the display content is selected for display to an intended user of the lens based on a profile of the intended user.

Example 3: The system of Example 1 or Example 2, wherein the display content is selected for display based on at least one of an orientation of the lens relative to a display device that displays the display content or a physical location of the lens relative to the display device.

Example 4: The system of Examples 1 through 3 wherein selection of the display content for display to an intended user is based on an eye gaze direction of the intended user.

Example 5: The system of Examples 1 through 4, wherein the display content is selected for display to an intended user based on a context in which the intended user views the display content.

Example 6: The system of Examples 1 through 5, wherein the context in which the intended user views the display content comprises at least one of a type of location of a display device that displays the display content, a brand associated with a location of the display device, a type of retailer associated with the location of the display device, a location of the intended user, a time of day that the intended user views the display content, a recent activity of the intended user, a presence of other intended users in proximity to the display device, or a type of activity of other intended users in proximity to the display device.

Example 7: The system of Examples 1 through 6, further comprising a display device that displays the display content and alternates between displaying one or more frames of display content selected for display to an intended user of the lens and one or more frames of display content not selected for display to the intended user, wherein the controller is further configured to synchronize the lens with a refresh rate of the display device such that one or more frames of the display content selected for display to the intended user pass through the lens, and one or more frames of the display content not selected for display to the intended user do not pass through the lens.

Example 8: The system of Examples 1 through 7, wherein the lens is a first lens and a second lens allows the display content to pass through the second lens when frames of the display content not selected for display to the intended user are being displayed.

Example 9: The system of Examples 1 through 8, wherein the lens comprises a liquid crystal layer, and application of a voltage or a current to the liquid crystal layer causes the lens to selectively allow the display content to pass through the lens.

Example 10: The system of Examples 1 through 9, wherein the lens comprises a liquid crystal shutter lens, and selectively allowing the display content to pass through the lens comprises controlling the liquid crystal shutter lens to pass the display content through the lens.

Example 11: The system of Examples 1 through 10, wherein the lens comprises a display device that adds artificial-reality content to the field of view of the lens.

Example 12: The system of Examples 1 through 11, wherein the camera comprises an optical device for determining that the display content is within the field of view of the lens, and the controller is configured to cause the lens to selectively allow the display content to pass through in response to determining that the display content is within the field of view of the lens.

Example 13: A method comprising capturing, via an optical device, a scene within a field of view of a lens; determining, by a controller, that display content of a display device is within the field of view of the lens; receiving, by a communication device, wireless synchronization information for display content; and selectively allowing, in response to determining that the display content is within the field of view of the lens, the display content to pass through the lens based on the wireless synchronization information.

Example 14: The method of Example 13, further comprising selecting the display content for display to an intended user based on a profile of the intended user.

Example 15: The method of Examples 13-14, further comprising selecting the display content for display to an intended user based on at least one of an orientation of the lens relative to a display device that displays the display content or a physical location of the lens relative to the display device.

Example 16: The method of Examples 13-15, further comprising selecting the display content for display to an intended user based on an eye gaze direction of the intended user.

Example 17: The method of Examples 13-16, further comprising selecting the display content for display to an intended user based on a context in which the intended user views the display content.

Example 18: The method of Examples 13-17, wherein the lens comprises a lens of a first eyewear device of a first user and a second eyewear device of a second user allows the display content to pass through a lens of the second eyewear device when frames of the display content not selected for display to the intended user are being displayed.

Example 19: The method of Examples 13-18, wherein the lens comprises a shutter lens and selectively allowing the display content to pass through the lens comprises controlling the shutter lens to pass the display content through the shutter lens.

Example 20: A computer-readable medium comprising computer-readable instructions that, when executed by at least one processor of a computing device, cause the computing device to: capture, via an optical device, a scene within a field of view of a lens; determine, by a controller, that display content of a display device is within the field of view of the lens; receive, by a communication device, wireless synchronization information for display content; and selectively allow, in response to determining that the display content is within the field of view of the lens, the display content to pass through the lens based on the wireless synchronization information.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A system comprising:
    a communication device configured to receive wireless synchronization information for display content;
    a first lens through which a first user can view the display content;
    a second lens through which a second user can view the display content;
    an optical device; and
    a controller configured to:
        determine, based on an output of the optical device, that the display content is within a field of view of the first lens and the second lens;
        in response to determining that the display content is within the field of view of the first lens and the second lens, cause the first lens and second lens to selectively allow the display content to pass through the first lens and second lens based on the wireless synchronization information; and
        in response to determining that the display content is within the field of view of the first lens and the second lens, increasing a frame rate at which the display content is generated to maintain image quality for both the first user and the second user.

2. The system of claim 1, wherein the display content is selected for display to the first user and the second user based on respective profiles of the first user and the second user.

3. The system of claim 1, wherein the display content is selected for display based on at least one of an orientation of the first lens and the second lens relative to a display device that displays the display content or a physical location of the first lens and the second lens relative to the display device.

4. The system of claim 1, wherein selection of the display content for display to the first user and the second user is based on the respective eye gaze directions of the first user and the second user.

5. The system of claim 1, wherein the display content is selected for display to the first user and the second user based on a context in which the first user and the second user view the display content.

6. The system of claim 5, wherein the context in which the first user and the second user view the display content comprises at least one of:
    a type of location where a display device displays the display content;
    a brand associated with a location of the display device;
    a type of retailer associated with the location of the display device;
    a location of the first user and the second user;
    a time of day that the first user and the second user view the display content;
    a recent activity of the first user and the second user;
    a presence of other intended users in proximity to the display device; or
    a type of activity of other intended users in proximity to the display device.

7. The system of claim 1, further comprising a display device that displays the display content and alternates between displaying one or more frames of display content selected for display to the first user of the lens and one or more frames of display content selected for display to the second user, wherein the controller is further configured to synchronize the lens with a refresh rate of the display device such that:

one or more frames of the display content selected for display to the first user pass through the first lens; and one or more frames of the display content selected for display to the second user do not pass through the first lens.

8. The system of claim 7, wherein:

the first lens comprises a lens of a first eyewear device of the first user; and a second eyewear device of the second user allows the display content to pass through the second lens of the second eyewear device when frames of the display content not selected for display to the first user are being displayed.

9. The system of claim 1, wherein:

each of the first lens and the second lens comprises a shutter lens; and selectively allowing the display content to pass through the respective first lens and second lens comprises controlling the shutter lens to pass the display content through the shutter lens.

10. The system of claim 9, wherein:

each of the first lens and the second lens comprises a liquid crystal layer; and periodic application of a voltage or a current to the liquid crystal layer causes the respective first lens and second lens to selectively allow the display content to pass through the respective first lens and second lens.

11. The system of claim 1, wherein each of the first lens and the second lens comprises an internal display device that displays artificial-reality content within the field of view of the respective first lens and second lens.

12. The system of claim 1, wherein the controller is configured to:

determine, based on an output of the optical device, that the display content is within the field of view of the first lens and of the second lens; and cause the respective first lens and second lens to selectively allow the display content to pass through in response to determining that the display content is within the field of view of the respective first lens and second lens.

13. A method comprising:

capturing, via an optical device, a scene within a field of view of a lens;

analyzing, by a controller, the scene to determine that display content of a display device is within the field of view of the lens;

receiving, by a communication device, wireless synchronization information for the display content;

selectively allowing, in response to determining that the display content is within the field of view of the lens, the display content to pass through the lens based on the wireless synchronization information;

displaying additional content with an internal display of the optical device; and coordinating the additional content from the internal display with the display content from the display device.

14. The method of claim 13, further comprising selecting the display content for display to an intended user based on a profile of the intended user.

15. The method of claim 13, further comprising selecting the display content for display to an intended user based on at least one of an orientation of the lens relative to a display device that displays the display content or a physical location of the lens relative to the display device.

16. The method of claim 13, further comprising determining an eye gaze direction of a user of the lens and selecting the display content for display to the user based on the eye gaze direction of the user.

17. The method of claim 13, further comprising selecting the display content for display to an intended user based on a context in which the intended user views the display content.

18. The method of claim 13, wherein:

the lens comprises a lens of a first eyewear device of a first user; and a second eyewear device of a second user allows the display content to pass through a lens of the second eyewear device when frames of the display content not selected for display to the first user are being displayed, further comprising:

increasing a frame rate of the display device during a time period when display content is provided to both the first user and the second user.

19. The method of claim 13, wherein:

the lens comprises a shutter lens; and selectively allowing the display content to pass through the lens comprises controlling the shutter lens to pass the display content through the shutter lens.

20. A non-transitory computer-readable medium comprising computer-readable instructions that, when executed by at least one processor of a computing device, cause the computing device to:

capture, via an optical device, a scene within a field of view of a lens;

analyze, by a controller, the scene to determine that display content of a display device is within the field of view of the lens;

receive, by a communication device, wireless synchronization information for display content;

selectively allow, in response to determining that the display content is within the field of view of the lens, the display content to pass through the lens based on the wireless synchronization information;

display additional content with an internal display of the optical device; and coordinate the additional content from the internal display with the display content from the display device.

* * * * *